(12) United States Patent
Takeguchi et al.

(10) Patent No.: US 8,137,863 B2
(45) Date of Patent: Mar. 20, 2012

(54) FUEL CELL

(75) Inventors: Shinsuke Takeguchi, Osaka (JP);
Kazuhito Hatoh, Osaka (JP); Hiroki Kusakabe, Osaka (JP); Toshihiro Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1001 days.

(21) Appl. No.: 12/020,249

(22) Filed: Jan. 25, 2008

(65) Prior Publication Data
US 2008/0171250 A1 Jul. 17, 2008

Related U.S. Application Data

(63) Continuation of application No. PCT/JP2006/313786, filed on Jul. 11, 2006.

(30) Foreign Application Priority Data

Jul. 27, 2005 (JP) ................................. 2005-217730

(51) Int. Cl.
*H01M 2/14* (2006.01)

(52) U.S. Cl. ........................................ 429/508; 429/507

(58) Field of Classification Search .................. None
See application file for complete search history.

(56) References Cited

U.S. PATENT DOCUMENTS

| 7,695,846 B2 * | 4/2010 | Sabin et al. ............... 429/457 |
| 2001/0044042 A1 * | 11/2001 | Inoue et al. ............... 429/35 |

FOREIGN PATENT DOCUMENTS

| EP | 1734604 | * 12/2006 |
| JP | 2002-042838 | 2/2002 |
| JP | 2002-260693 | 9/2002 |
| JP | 2003-031237 | 1/2003 |
| JP | 2004-119121 | 4/2004 |
| JP | 2005-093169 | 4/2005 |
| WO | WO 2004/047210 | * 6/2004 |
| WO | WO 2005/024279 | * 3/2005 |

OTHER PUBLICATIONS

Machine translation of JP 2004-119121 retrived from <http://www.ipdl.inpit.go.jp/homepg_e.ipdl> on Mar. 17, 2011.*

* cited by examiner

*Primary Examiner* — Cynthia Lee
(74) *Attorney, Agent, or Firm* — McDermott Will & Emery LLP

(57) ABSTRACT

Even if reaction gas flows into a substantially rectangular anode-side and cathode-side gaps formed between an annular main body portion and a membrane electrode assembly in an anode side and a cathode side of a fuel cell, the reaction gas is prevented from flowing out from an outlet without passing through an electrode to cause degradation of power generation efficiency. At least one of anode-side gasket and cathode-side gasket in the fuel cell is provided with an extra sealing portion connected to an annular main body portion in such a manner that, among two pairs of gap portions opposing to each other in the anode-side gap and the cathode-side gap, the extra sealing portion intersects with one pair of gap portions having a larger pressure gradient of fuel gas and oxidant gas in a direction from an upstream side to a downstream side of a fuel gas flow channel and an oxidant gas flow channel.

5 Claims, 12 Drawing Sheets

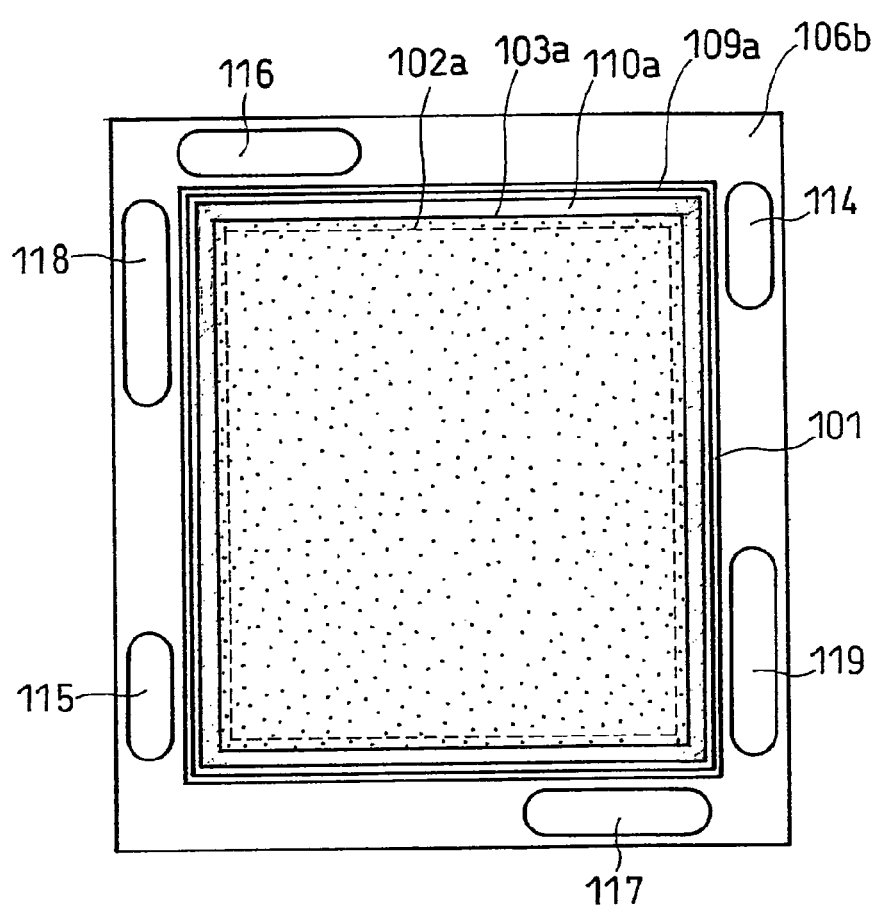
F I G. 1 2

FUEL CELL

This application is a continuation of International Application No. PCT/JP2006/313786, whose international filing date is Jul. 11, 2006 which in turn claims the benefit of Japanese Patent Application No. 2005-217730, filed on Jul. 27, 2005, the disclosures of which Applications are incorporated by reference herein. The benefit of the filing and priority dates of the International and Japanese Applications is respectfully requested.

TECHNICAL FIELD

The present invention relates to a fuel cell, and specifically to a polymer electrolyte fuel cell.

BACKGROUND ART

In a polymer electrolyte fuel cell, a fuel gas such as hydrogen and an oxidant gas such as air are electrochemically reacted in an anode and a cathode serving as gas diffusion electrodes, respectively, thereby to generate electricity and heat at the same time. FIG. 10 shows a schematic exploded sectional view of a main part of the general basic configuration of such a polymer electrolyte fuel cell. A fuel cell 100, as shown in FIG. 10, comprises at least one unit cell mainly including a membrane electrode assembly (MEA) 105, and a pair of plate-shaped separators sandwiching the membrane electrode assembly 105, namely, an anode-side separator 106a and a cathode-side separator 106b.

The membrane electrode assembly 105 has a configuration such that a polymer electrolyte membrane 101 for selectively transporting cations (hydrogen ions) is disposed between an anode 104a and a cathode 104b. Further, the anode 104a at least includes a catalyst layer 102a disposed in its polymer electrolyte membrane 101 side in a close contact manner, and a gas diffusion layer 103a disposed between the foregoing catalyst layer 102a and the anode-side separator 106a; and the cathode 104b at least includes a catalyst layer 102b disposed in its polymer electrolyte membrane 101 side in a close contact manner, and a gas diffusion layer 103b disposed between the foregoing catalyst layer 102b and the cathode-side separator 106b.

The catalyst layers 102a and 102b are mainly composed of a conductive carbon powder carrying an electrode catalyst (e.g., platinum-group metal). The gas diffusion layers 103a and 103b have electric conductivity as well as gas permeability. The gas diffusion layers 103a and 103b are fabricated, for example, by forming a conductive water-repellent layer made of a conductive carbon powder and a fluorocarbon resin on a conductive porous base material made of carbon.

Here, as shown in FIG. 10, an MEA 105 is configured in such a manner that, in view of disposing gaskets 109a and 109b for preventing gas leakage, the main face of the polymer electrolyte membrane 101 is larger than the main faces of the anode 104a and the cathode 104b, and the polymer electrolyte membrane 101 is positioned such that its whole peripheral edge protrudes outside the peripheral edges of the anode 104a and the cathode 104b. Herein, the peripheral edge of the polymer electrolyte membrane 101 protruding outside the peripheral edges of the anode 104a and the cathode 104b is also referred to as a "protruding portion" (P in FIG. 10).

The anode-side separator 106a and the cathode-side separator 106b have electric conductivity, and serve to mechanically fix the MEA 105 as well as to electrically connect in series MEAs 105 adjacent to each other in the case where a plurality of MEAs 105 are stacked. Further, in the anode-side separator 106a and the cathode-side separator 106b, a fuel gas flow channel 107a and an oxidant gas flow channel 107b for supplying reaction gas to the anode 104a and the cathode 104b and carrying away gas including products produced by electrode reactions and unreacted reactants to the outside of the MEA 105 are formed in one face thereof (i.e., the main faces of the anode-side separator 106a and the cathode-side separator 106b, the faces being in contact with the anode 104a and the cathode 104b, respectively).

Further, in the other face of the anode-side separator 106a and the cathode-side separator 106b, cooling fluid flow channels 108a and 108b for introducing a cooling fluid (cooling water etc.) which serve to adjust the cell temperature at a substantially constant level are formed. By configuring such that the cooling fluid is circulated between the fuel cell and an externally arranged heat exchanger, heat energy generated by reaction can be utilized in a form of hot water etc.

The fuel gas flow channel 107a and the oxidant gas flow channel 107b are generally formed by providing grooves on one main face of the anode-side separator 106a and the cathode-side separator 106b, which is in contact with the anode 104a and the cathode 104b, respectively, for the reason that this can advantageously simplify the production process, and others. Further, the cooling fluid flow channels 108a and 108b are generally formed by providing grooves on the other main face of the anode-side separator 106a and the cathode-side separator 106b, which are facing to the outside.

In a so-called stacked fuel cell (fuel cell stack) obtained by electrically connecting a plurality of MEAs 105 in series with the anode-side separators 106a and the cathode-side separators 106b interposed between the plurality of MEAs 105, a manifold for dividing the flow of the reaction gas fed to the fuel cell to supply the gas to each MEA 105 (a manifold (not shown) formed by combining manifold apertures for supplying reaction gas in a continuously stacked manner, and manifold apertures for discharging reaction gas in a continuously stacked manner, the manifold apertures being provided in the anode-side separators 106a and the cathode-side separators 106b) is provided.

In addition, a manifold for dividing the flow of a cooling fluid fed to the fuel cell to supply the fluid to each MEA 105 (a manifold (not shown) formed by combining manifold apertures for supplying cooling fluid in a continuously stacked manner, and manifold apertures for discharging cooling fluid in a continuously stacked manner, the manifold apertures being provided in the anode-side separators 106a and the cathode-side separators 106b) is provided. The manifold formed in the interior of the fuel cell as described above is referred to as an internal manifold, and a typical fuel cell is such an "internal manifold type" fuel cell.

FIG. 11 shows a cross section taken along line III-III of FIG. 10 (i.e., a front view of the anode-side separators 106a in the conventional fuel cell 100 viewed from its fuel gas flow channel 107a side), a region of which being in contact with the anode-side gasket 109a is shown by hatching. Although not shown, a front view of the cathode-side separator 106b in the conventional fuel cell 100 viewed from its oxidant gas flow channel side 107b is similar to this.

As is shown in FIG. 11, the anode-side separator 106a is provided with a manifold aperture 114 for supplying fuel gas, a manifold aperture 115 for discharging fuel gas, a manifold aperture 118 for supplying cooling fluid, a manifold aperture 119 for discharging cooling fluid, a manifold aperture 116 for supplying oxidant gas, and a manifold aperture 117 for discharging oxidant gas. Likewise, the cathode-side separator 106b is provided with each manifold aperture.

Next, FIG. 12 is a cross section taken along line IV-IV of FIG. 10 (i.e., a front view of the conventional fuel cell 100 after the anode-side separator 106a is removed, viewed from its anode-side separator 106a side (before removal). Although not shown, a front view of the conventional fuel cell 100 after the cathode-side separator 106b is removed, viewed from its cathode-side separator 106b side (before removal) is similar to this.

In the conventional fuel cell 100, in order to prevent gas leakage of reaction gas (leakage of fuel gas to the cathode side 104b, leakage of oxidant gas to the anode side 104a, leakage of reaction gas outside the MEA 105, etc.), between the opposing anode-side separator 106a and the cathode-side separator 106b, a pair of opposing gaskets having a gas sealing function, namely, the anode-side gasket 109a and the cathode-side gasket 109b, are disposed on the peripheral edge of the MEA 105 (the protruding portion P of the polymer electrolyte membrane 101 outside the anode 104a and the cathode 104b).

These anode-side gasket 109a and the cathode-side gasket 109b has, for example, a cross section of a substantially rectangular shape and a continuous annular structure, can be fabricated in a conventionally known manner with a use of, for example, an O-ring, a rubber sheet, a composite sheet of an elastic resin and a rigid resin, etc., and serve to sandwich the foregoing whole protruding portion P of the polymer electrolyte membrane. In view of the easiness in handling of the MEA 105, gaskets made of a composite material having a certain degree of rigidity are usually used in integration with the MEA 105.

As a result of disposing the anode-side gasket 109a and the cathode-side gasket 109b as described above such that the foregoing whole protruding portion of the polymer electrolyte membrane 101 is sandwiched by these gaskets, one closed-space enveloping the anode 104a is formed by the anode-side separator 106a, the polymer electrolyte membrane 101 and the anode-side gasket 109a; and another closed-space enveloping the cathode 104b is formed by the cathode-side separator 106b, the polymer electrolyte membrane 101 and the cathode-side gasket 109b. These closed-spaces serve to prevent leakage of reaction gas supplied to the anode 104a and the cathode 104b.

It should be noted that in the case where the anode-side gasket 109a and the cathode-side gasket 109b are disposed in the foregoing position, there inevitably occurs a working tolerance, an assembling tolerance, etc. of the component parts. It is therefore extremely difficult to bring the anode-side gasket 109a and the cathode-side gasket 109b in sufficiently close contact with the end face of the anode 104a and the cathode 104b, respectively. Accordingly, as shown in FIGS. 10 to 12, in the case where the anode-side gasket 109a and the cathode-side gasket 109b are disposed in the foregoing position, gaps are easily formed between the anode-side gasket 109a and the anode 104a, and between the cathode-side gasket 109b and the cathode 104b (i.e., a anode-side gap 110a and a cathode-side gap 110b).

If the anode-side gap 110a and the cathode-side gap 110b as described above are formed, a case may occur in which the reaction gas leaks into the anode-side gap 110a and the cathode-side gap 110b. In another case, part of the reaction gas fails to flow into the interior of the anode 104a and the cathode 104b, and moves through the anode-side gap 110a and the cathode-side gap 110b and is discharged outside the MEA 105. This disadvantageously has made it extremely difficult to maintain an effective power generation performance.

In addition, when fabricating a stacked-type fuel cell stack, the anode-side gap 110a and the cathode-side gap 110b have been provided intentionally from the design stage in order to prevent the anode-side gasket 109a and the cathode-side gasket 109b from overlapping with the anode 104a and the cathode 104b, for the purpose of improving the productivity. For this reason also, it has been difficult to eliminate the anode-side gap 110a and the cathode-side gap 110b.

DISCLOSURE OF THE INVENTION

Problem to be Solved by the Invention

However, in the foregoing conventional technique in which another sealing member is disposed in the anode-side gap 110a and the cathode-side gap 110b, there has been a possibility that the catalyst layers 102a and 102b, or the anode-side gasket 109a and the cathode-side gasket 109b may be deformed by the another sealing member. Therefore, there is a room for improvement in solving the foregoing problem. Moreover, since it is impossible to prevent the occurrence of a working tolerance, an assembling tolerance, etc. of the component parts even with this conventional technique, it has been extremely difficult to bring another sealing member sufficiently in close contact with the end face of the anode 104a and the cathode 104b. For this reason, it has been extremely difficult to completely seal the anode-side gap 110a and the cathode-side gap 110b.

The present invention has been conceived in view of the above problem, and intends to provide a fuel cell capable of ensuring a sufficient power generation performance with a simple configuration, in which even when such gaps as described above are formed between the anode-side and cathode-side gaskets, and the end faces of the anode and the cathode, it is possible to prevent reaction gas from flowing into the gaps, and thus to effectively utilize the reaction gas for electrode reactions.

Means for Solving the Problem

The present invention, in order to achieve the foregoing purpose, provides a fuel cell including a unit cell comprising:

a membrane electrode assembly including a polymer electrolyte membrane with hydrogen ion conductivity, and an anode and a cathode sandwiching the polymer electrolyte membrane;

an anode-side separator with electric conductivity including a fuel gas flow channel for supplying and discharging a fuel gas to and from the anode;

a cathode-side separator with electric conductivity including an oxidant gas flow channel for supplying and discharging an oxidant gas to and from the cathode; and an anode-side gasket and a cathode-side gasket disposed on circumference portions of the membrane electrode assembly, in faces of the anode-side separator and the cathode-side separator in the membrane electrode assembly side, for sealing the fuel gas and the oxidant gas, respectively, wherein an anode-side gap and a cathode-side gap of a substantially rectangular shape are formed between the anode-side gasket and the cathode-side gasket, and the membrane electrode assembly in the sides of the anode and the cathode, at least one of the anode-side gasket and the cathode-side gasket has: an annular main body portion disposed along the circumference portion of the membrane electrode assembly; and an extra sealing portion connected to the main body portion such that, among two pairs of gap portions opposing to each other in the anode-side gap and the cathode-side gap, the extra sealing portion intersects with one pair of the gap portions having a larger pressure gradient of the fuel gas and the oxidant gas in a direction from an upstream side to a downstream side of the fuel gas flow channel and the oxidant gas flow channel.

With such configuration of the present invention as described above, even when reaction gas flows into the anode-side gap and the cathode-side gap formed between the anode-side and cathode-side gaskets, and the membrane electrode assembly, the extra sealing portion can shut off the flow thereof, and thus it is possible to effectively inhibit the reaction gas from being directly discharged, without being used for electrode reactions while flowing from a manifold for supplying reaction gas to a manifold for discharging reaction gas.

It is possible therefore to provide a fuel cell capable of efficiently using reaction gas for electrode reactions and favorably improving a power generation performance, in which even when the reaction gas flows into the anode-side gap or the cathode-side gap around the manifold for supplying reaction gas, the reaction gas will be surely introduced into the face of the anode or the cathode by virtue of the extra sealing portion.

In other words, according to the present invention, it is possible to easily and reliably obtain a polymer electrolyte fuel cell capable of ensuring a sufficient power generation performance with a simple configuration, in which an effective utilization of reaction gas for electrode reactions is possible.

The "reaction gas" as used herein includes a fuel gas and an oxidant gas, and in some cases includes the fuel gas and the oxidant gas containing products produced by electrode reactions or unreacted reactants.

Effect of the Invention

According to the present invention, by providing an extra sealing portion for partitioning the MEA into a plurality of portions as a gasket configuration, the sealing portion shuts off the flow of the reaction gas having flown into the gaps formed between the gaskets and the MEA. Consequently, the reaction gas flown into the gaps will not directly flow from a manifold for supplying reaction gas to a manifold for discharging reaction gas, and thus even when the reaction gas flows into the gaps around the manifold for supplying reaction gas, the reaction gas can be reliably introduced into the face of the anode or the cathode.

As such, if there are clearances (gaps) between the MEA and the gaskets in order to improve assembly performance of a fuel cell in the process of its fabrication, it is possible to provide a fuel cell capable of efficiently using the reaction gas in power generation of the fuel cell and favorably improving the power generation performance.

Moreover, according to the present invention, the reaction gas flow channel has a serpentine shape, and the extra sealing portion is provided in the longitudinal direction of the reaction gas flow channel. As such, the extra sealing portion can reliably shut off the flow of the reaction gas having flown into the gaps formed between the gaskets and the MEA. In the case where the reaction gas flow channel has a channel configuration composed of straight lines from the manifold for supplying reaction gas to the manifold for discharging reaction gas, since the channel length of the reaction gas flow channel is short as compared with that of the reaction gas flow channel of a serpentine shape, the pressure loss caused while the reaction gas flows in the flow channel is relatively smaller than that of a serpentine shape.

Consequently, in the case of a linear flow channel configuration, the possibility that the reaction gas may flow into the gaps between the gaskets and the MEA is small. However, even in the case of the linear flow channel, if a flow channel configuration in which the aspect ratio is large and the flow channel length is long is employed and the pressure loss is increased, the proportion of the anode-side gap and the cathode-side gap to the reaction gas flow channel cannot be ignored. Therefore, disposing an extra sealing portion in the electrode face according to the present invention is effective. However, there is a disadvantage that the shape of the fuel cell as a whole may be unbalanced.

BRIEF DESCRIPTION OF THE DRAWINGS

FIG. 12 A view showing a cross section taken along line IV-IV of FIG. 10 (i.e., a front view of the fuel cell 100 in FIG. 10 after the anode-side separator 106a is removed, viewed from its anode-side separator 106a side (before removal)).

BEST MODE FOR CARRYING OUT THE INVENTION

Figure 1:
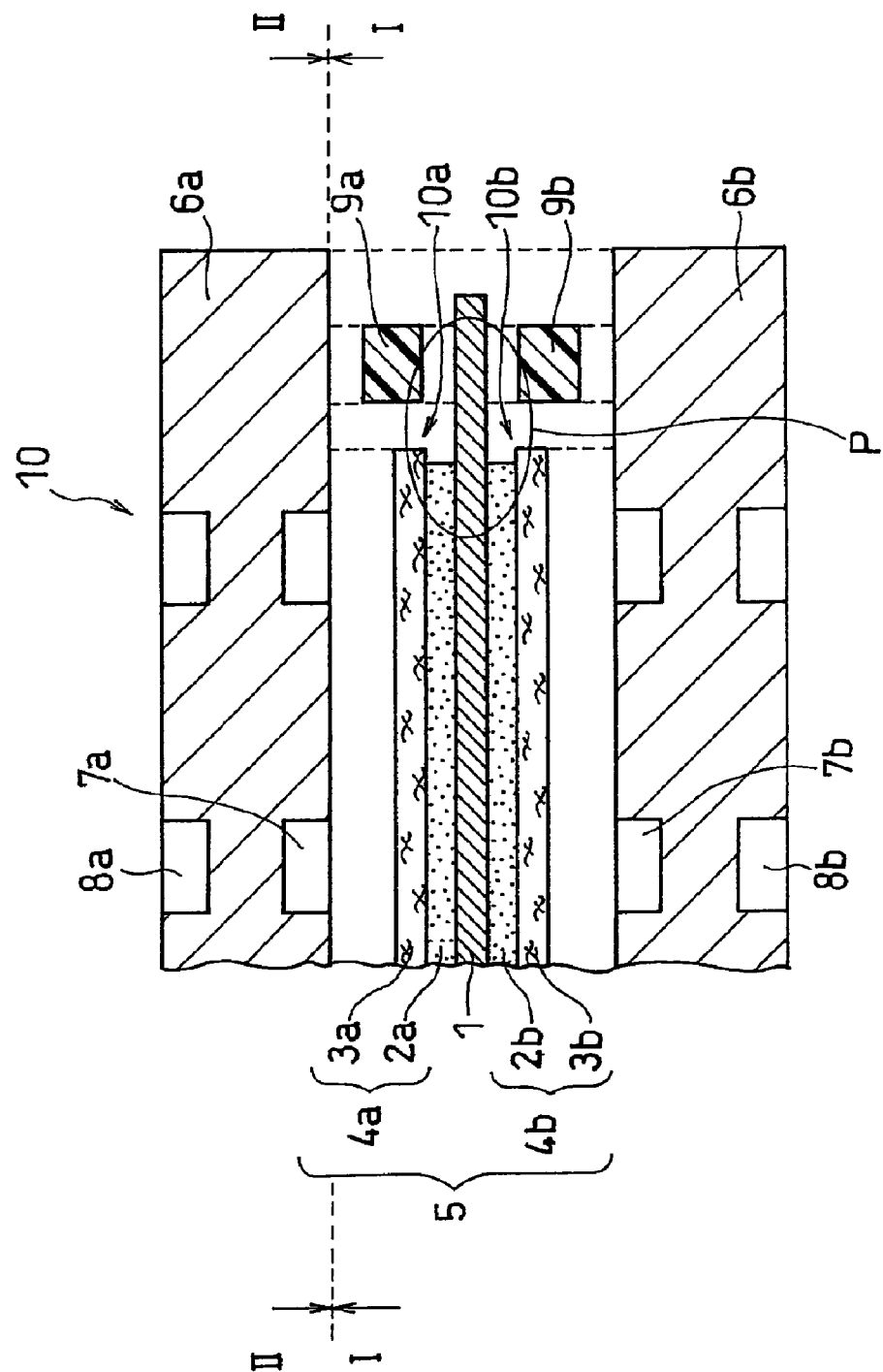
FIG. 1 A schematic exploded sectional view showing a main part of a basic configuration of a first embodiment of a polymer electrolyte fuel cell of the present invention.

Preferred embodiments of the present invention are described below with reference to the drawings. It should be noted that in the descriptions below, identical or correspondent parts are denoted by a same reference numeral and the repetitive description thereof may be omitted.

First Embodiment

FIG. 1 is a schematic exploded sectional view showing a main part of a basic configuration of a first embodiment of a polymer electrolyte fuel cell of the present invention. A fuel cell 10 of the present invention, configured by combining the components as shown in FIG. 1 in the positions as shown by broken line, comprises at least one unit cell mainly including a membrane electrode assembly (MEA) 5, and a pair of plate-shaped separators sandwiching the membrane electrode assembly 5, namely, an anode-side separator 6a and a cathode-side separator 6b.

The membrane electrode assembly 5 has a configuration such that a polymer electrolyte membrane (e.g., Nafion 112 (trade name) membrane made of perfluorocarbon sulfonic acid available from E.I. du Pont de Nemours and Company, U.S.A.) 1 for selectively transporting cations (hydrogen ions) is disposed between an anode 4a and a cathode 4b. Further, the anode 4a at least includes a catalyst layer 2a disposed in its polymer electrolyte membrane 1 side in a close contact manner, and a gas diffusion layer 3a disposed between the foregoing catalyst layer 2a and the anode-side separator 6a; and the cathode 4b at least includes a catalyst layer 2b disposed in its polymer electrolyte membrane 1 side in a close contact manner, and a gas diffusion layer 3b disposed between the foregoing catalyst layer 2b and the cathode-side separator 6b.

The catalyst layers 2a and 2b are mainly composed of a conductive carbon powder (e.g., carbon black) carrying an electrode catalyst (for example, platinum-group metal). Such catalyst layers 2a and 2b may be formed in the manner known in the art with the use of an ink for forming a catalyst layer including conductive carbon particles carrying the electrode catalyst, a polymer electrolyte with cation (hydrogen ion) conductivity, and a dispersion medium.

The gas diffusion layers 3a are 3b have electric conductivity as well as gas permeability. The gas diffusion layers 3a and 3b are fabricated, for example, by forming a conductive water-repellent layer made of a conductive carbon powder (e.g., a carbon black) and a fluorocarbon resin on a conductive porous base material made of carbon. For the conductive porous base material, a typical one such as carbon paper, cloth, felt, or the like may be used.

Here, as shown in FIG. 1, an MEA 5 is configured in such a manner that, in view of disposing gaskets 9a and 9b for preventing gas leakage, the main face of the polymer electrolyte membrane 1 is larger than the main faces of the anode 4a and the cathode 4b, and the polymer electrolyte membrane 1 is positioned such that its whole peripheral edge (the protruding portion P) protrudes outside the peripheral edges of the anode 4a and the cathode 4b.

The anode-side separator 6a and the cathode-side separator 6b have electric conductivity, and serve to mechanically fix the MEA 5 as well as to electrically connect in series MEAs 5 adjacent to each other in the case where a plurality of MEAs 5 are stacked. Further, a fuel gas flow channel 7a and an oxidant gas flow channel 7b for supplying reaction gas to the anode 4a and the cathode 4b and carrying away gas including products produced by electrode reactions and unreacted reactants to the outside of the MEA 5 are formed in one face of the anode-side separator 6a and one face of the cathode-side separator 6b, respectively (i.e., the main faces of the anode-side separator 6a and the cathode-side separator 6b, the faces being in contact with the anode 4a and the cathode 4b, respectively).

Further, in the other face of the anode-side separator 6a and the cathode-side separator 6b, cooling fluid flow channels 8a and 8b for introducing a cooling fluid (cooling water etc.) which serve to adjust the cell temperature at a substantially constant level are formed. By configuring such that the cooling fluid is circulated between the fuel cell and an externally arranged heat exchanger, heat energy generated by reaction can be utilized in a form of hot water etc.

The fuel gas flow channel 7a and the oxidant gas flow channel 7b are generally formed by providing grooves on one main face of the anode-side separator 6a and the cathode-side separator 6b, which is in contact with the anode 4a and the cathode 4b, respectively, for the reason that this can advantageously simplify the production process, and others. Further, the cooling fluid flow channels 8a and 8b are generally formed by providing grooves on the other main face of the anode-side separator 6a and the cathode-side separator 6b, which are facing to the outside.

The fuel cell 10 of the present invention may be used as a so-called stacked fuel cell (fuel cell stack) obtained by electrically connecting a plurality of MEAs 5 in series with the anode-side separators 6a and the cathode-side separators 6b interposed between the plurality of MEAs 5. In this case, a manifold for dividing the flow of the reaction gas fed to the fuel cell to supply the gas to each MEA 5 (a manifold (not shown) formed by combining manifold apertures for supplying reaction gas in a continuously stacked manner, and manifold apertures for discharging reaction gas in a continuously stacked manner, the manifold apertures being provided in the anode-side separators 6a and the cathode-side separators 6b) is provided.

In addition, a manifold for dividing the flow of a cooling fluid fed to the fuel cell to supply the fluid to each MEA 5 (a manifold (not shown) formed by combining manifold apertures for supplying cooling fluid in a continuously stacked manner, and manifold apertures for discharging cooling fluid in a continuously stacked manner, the manifold apertures being provided in the anode-side separators 6a and the cathode-side separators 6b) is provided.

Figure 2:
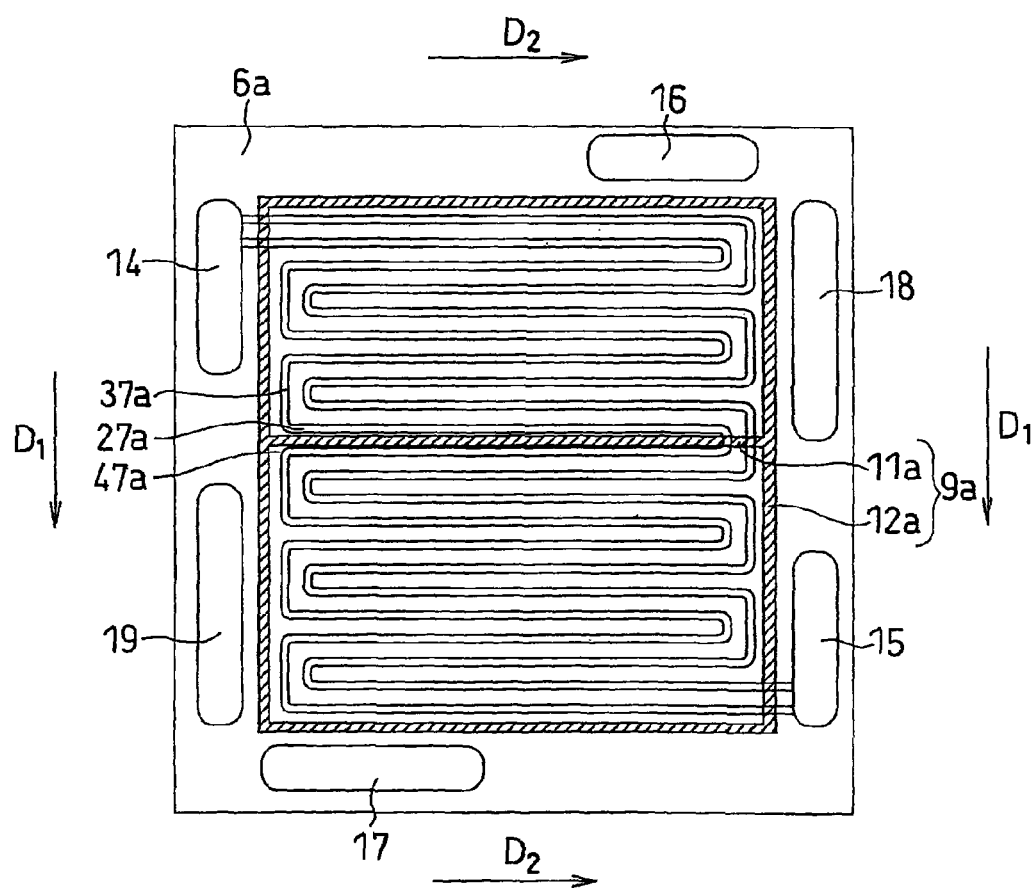
FIG. 2 A view showing a cross section taken along line I-I of FIG. 1 (i.e., a front view of an anode-side separator 6a in a fuel cell 10 of the first embodiment viewed from its fuel gas flow channel 7a side).

FIG. 2 is a view showing a cross section taken along line I-I of FIG. 1 (i.e., a front view of the anode-side separator 6a in the fuel cell 10 of this embodiment viewed from its fuel gas flow channel 7a side), a region of which being in contact with the anode-side gasket 9a is shown by hatching. Although not shown, a front view of the cathode-side separator 6b in the fuel cell 10 viewed from its oxidant gas flow channel side 7b is similar to this.

As is shown in FIG. 2, the anode-side separator 6a is provided with a manifold aperture 14 for supplying fuel gas, a manifold aperture 15 for discharging fuel gas, a manifold aperture 18 for supplying cooling fluid, a manifold aperture 19 for discharging cooling fluid, a manifold aperture 16 for supplying oxidant gas, and a manifold aperture 17 for discharging oxidant gas. Likewise, the cathode-side separator 6b is provided with each manifold aperture.

Figure 3:
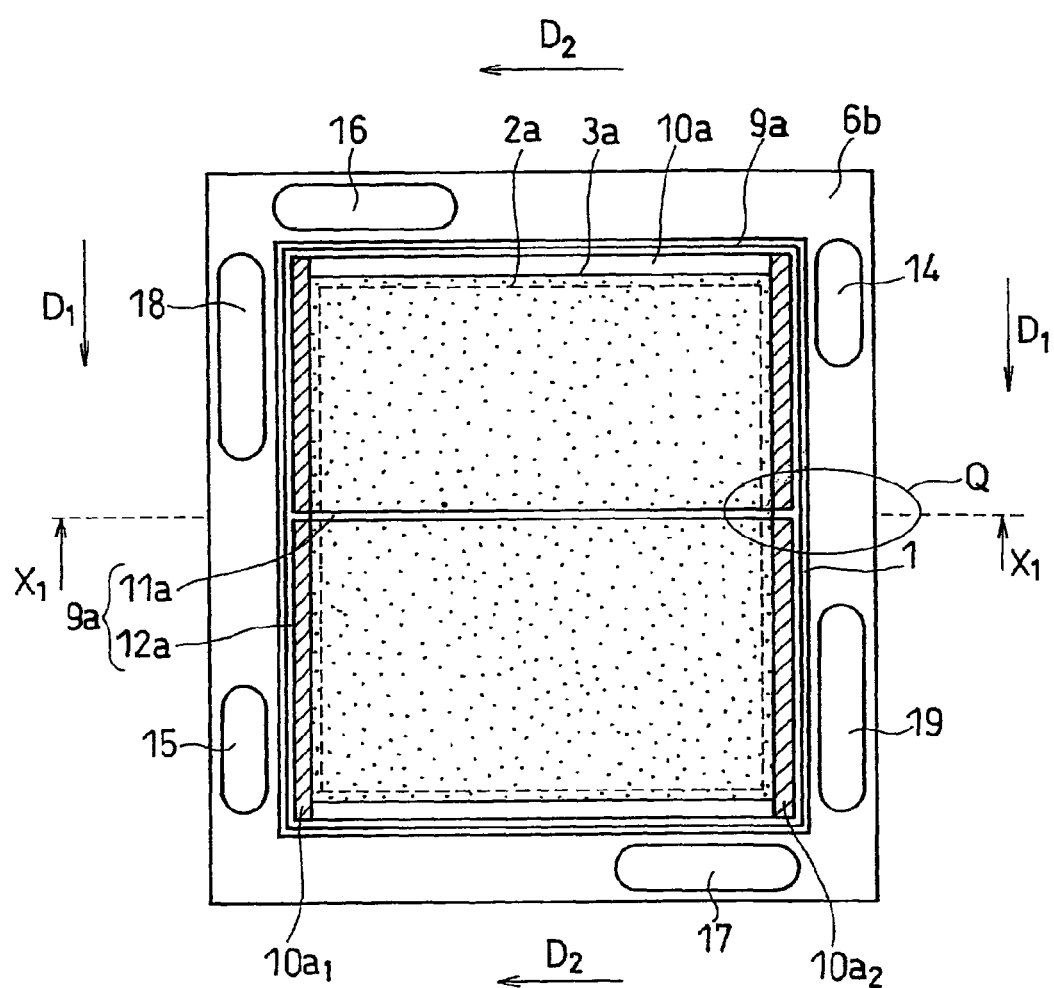
FIG. 3 A view showing a cross section taken along line II-II of FIG. 1 (i.e., a front view of the fuel cell 10 of FIG. 1 after the anode-side separator 6a is removed, viewed from its anode-side separator 6a side (before removal)).

FIG. 3 is a view showing a cross section taken along line II-II of FIG. 1 (i.e., a front view of the fuel cell 10 of FIG. 1 after the anode-side separator 6a is removed, viewed from its anode-side separator 6a side (before removal)). Although not shown, a front view of the fuel cell 10 after the cathode-side separator 6b is removed, viewed from its cathode-side separator 6b side (before removal) is similar to this.

As shown in FIG. 1 to FIG. 3, in the fuel cell 10 of this embodiment, in order to prevent gas leakage of reaction gas (leakage of fuel gas to the cathode 4b side, leakage of oxidant gas to the anode 4a side, leakage of reaction gas outside the MEA 5, etc.), between the opposing anode-side separator 6a and the cathode-side separator 6b, a pair of opposing gaskets having a gas sealing function, namely, the anode-side gasket 9a and the cathode-side gasket 9b, are disposed on the peripheral portion of the MEA 5 (the protruding portion P of the polymer electrolyte membrane 1 outside the anode 4a and the cathode 4b).

Here, description is made about the anode-side gasket 9a as a typical example. The anode-side gasket 9a includes an annular main body portion (sealing portion) 12a having, for example, a cross section of substantially rectangular shape and a continuous annular structure. This annular main body portion 12a can be fabricated in a conventionally known manner with a use of, for example, an O-ring, a rubber sheet, a composite sheet of an elastic resin and a rigid resin, etc., and serve to sandwich the foregoing whole protruding portion P of the polymer electrolyte membrane. In view of the easiness in handling of the MEA 5, gaskets made of a composite material having a certain degree of rigidity are usually used in integration with the MEA 5.

As a result of disposing the annular main body portion 12a of the anode-side gasket 9a as described above in such a manner that the foregoing whole protruding portion of the polymer electrolyte membrane 1 is covered by this portion, one closed-space enveloping the anode 4a is formed by the anode-side separator 6a, the polymer electrolyte membrane 1 and the annular main body portion 12a. This closed-space, namely, an anode-side gap 10a, serves to prevent gas leakage of the reaction gas supplied to the anode 4a.

Although not shown, as is similar to in the anode side, the cathode-side gasket 9b has an annular main body portion, and another closed-space enveloping the cathode 4b, namely, a cathode-side gap 10b, is formed by the cathode-side gasket 9b, the cathode-side separator 6b, the polymer electrolyte membrane 1 and the foregoing annular main body portion (see FIG. 1).

In the case where the anode-side gasket 9a composed of the annular main body portion 12a only and the cathode-side gasket 9b composed of the annular portion (not shown) only are disposed in the foregoing positions, as is similar to the case of the foregoing conventional gaskets, the anode-side gap 10a and the cathode-side gap 10b are formed due to a working tolerance, an assembling tolerance, etc. of the component parts, allowing the reaction gas to leak into the anode-side gap 10a and the cathode-side gap 10b. Consequently, part of the reaction gas fails to flow into the interior of the anode 4a and the cathode 4b, and moves through the anode-side gap 10a and the cathode-side gap 10b and is discharged outside the MEA 5. This disadvantageously makes it extremely difficult to maintain an efficient power generation performance.

In this embodiment, as shown in FIG. 2 and FIG. 3, the anode-side gasket 9a is composed of the annular main body portion 12a and an extra sealing portion 11a. More specifically, the annular main body portion 12a of the anode-side gasket 9a is provided with the extra sealing portion 11a in such a manner that, among two pairs of gap portions opposing to each other in the anode-side gap 10a, the extra sealing portion 11a intersects with one pair of the gap portions having a larger pressure gradient of fuel gas in a direction from an upstream side to a downstream side of the fuel gas.

In other words, among two pairs of sides opposing to each other in the annular main body portion 12a, the extra sealing portion 11a for connecting one pair of the sides adjacent to the forgoing pair of gap portions having a larger pressure gradient as described above is provided. Although this extra sealing portion 11a may be formed independently of the annular main body portion 12a and used by bonding the two, it is preferable that the two be formed in an integral manner in view of the problem in the production process, and the like.

The fuel gas flow channel 7a connecting the manifold aperture 14 for supplying fuel gas with the manifold aperture 15 for discharging fuel gas is composed of two parallel grooves as shown in FIG. 2, in which a pressure gradient of fuel gas occurs in a direction from an upstream side to a downstream side. Accordingly, the substantially rectangular anode-side gap 10a also includes a pair of gap portions having a smaller pressure gradient and being in substantially parallel with the direction indicated by an arrow $D_2$; and a pair of gap portions having a larger pressure gradient and being in substantially parallel with the direction indicated by an arrow $D_1$ (a pair of portions $10a_1$ and $10a_2$ defined by hatching in FIG. 3).

For this reason, in this embodiment, the extra sealing portion 11a is connected with the annular main body portion 12a so as to intersect with the pair of gap portions (the pair of portions $10a_1$ and $10a_2$ defined by hatching in FIG. 3) having a larger pressure gradient of fuel gas and being in substantially parallel with the direction indicated by the arrow $D_1$, namely, the direction in which the fuel gas moves more readily by virtue of the pressure gradient as described above.

Figure 4:
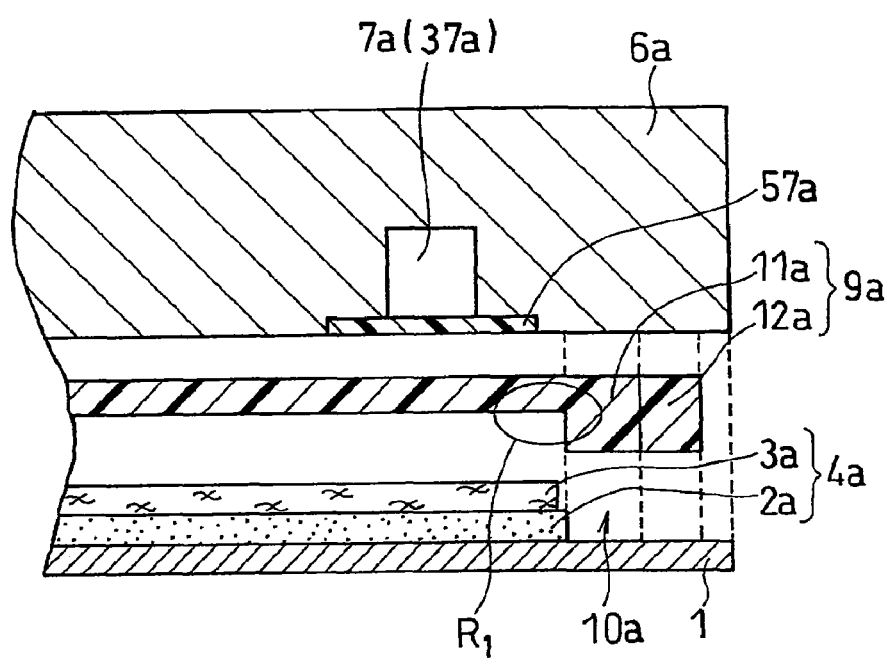
FIG. 4 A schematic exploded sectional view showing a main part in the anode 4a side of a cross section taken along line $X_1$-$X_1$ of FIG. 3.

FIG. 4 shows a schematic exploded sectional view showing a main part in the anode 4a side of a cross section taken along line $X_1$-$X_1$ of FIG. 3. As shown in FIG. 4, the anode-side gasket 9a in this embodiment has the annular main body portion 12a and the extra sealing portion 11a. In the cross-section of the extra sealing portion 11a, a portion $R_1$ fitting to the anode 4a has a right-angled step between the annular main body portion 12a and the extra sealing portion 11a.

As such, it is possible to achieve an effect of reliably blocking the anode-side gap 10a while reliably fixing (positioning) the anode 4a without being crushed by the extra sealing portion 11a. Here, in the region where the extra sealing portion 11a and the fuel gas flow channel 7a are in contact with each other, in order to prevent leakage of fuel gas, a screen plate 57a may be provide.

Although not shown, also in the cathode side, an extra sealing portion similar to those provided for the anode-side gasket 9a and a screen plate are provided.

According to this embodiment, since the extra sealing portion as described above is provided, even when the reaction gas flows into the anode-side gap 10a and the cathode-side gap 10b formed between the anode-side gasket 9a and the cathode-side gasket 9b, and the membrane electrode assembly 5, the flow therein can be blocked by the extra sealing portion. This makes it possible to effectively inhibit the reaction gas from being directly discharged, without being used for electrode reactions while flowing from a manifold for supplying reaction gas to a manifold for discharging reaction gas.

Consequently, it is possible to provide a fuel cell capable of efficiently using the reaction gas for electrode reactions and favorably improving a power generation performance, in which even when the reaction gas flows into the anode-side gap 10a or the cathode-side gap 10b around the manifold for supplying reaction gas, the reaction gas can be surely introduced into the face of the anode 4a or the cathode 4b by virtue of the extra sealing portion.

The fuel gas flow channel 7a according to this embodiment, as shown in FIG. 2, is composed of two parallel grooves connecting the manifold aperture 14 for supplying fuel gas with the manifold aperture 15 for discharging fuel gas. These grooves have a serpentine shape including a plurality of straight line portions 27a and a curved portion 37a connecting the straight line portions adjacent to each other. Although not shown, the oxidant gas flow channel 7b has a similar shape. The extra sealing portion 11a is placed on a rib 47a between the plurality of straight line portions 27a. The cathode side is configured in a similar manner.

With such a configuration as described above, it is possible to reliably form, in two pairs of gap portions included in the respective anode-side gap 10a and the cathode-side gap 10b, a pair combination having a larger pressure gradient and a pair combination having a smaller pressure gradient, and to more reliably obtain the effect of the present invention as described above without obstructing the flow of the fuel gas and the oxidant gas in the fuel gas flow channel 7a and the oxidant gas flow channel 7b.

Moreover, the extra sealing portion 11a, as shown in FIG. 2, is preferably placed closer to an inlet side (i.e., the manifold aperture 14 for supplying fuel gas side) than an outlet side (i.e., the manifold aperture 15 for discharging fuel gas side) of the fuel gas flow channel 7a.

The amount of fuel gas flowing in the anode-side gap 10a between the anode-side gasket 9a and the membrane electrode assembly 5 is equivalent to a gas amount when the pressure loss in the anode-side gap 10a before the extra sealing portion 11a becomes equal to the pressure loss in the fuel gas flow channel 7a before the extra sealing portion 11a. Moreover, since the extra sealing portion 11a is provided, the fuel gas flowing in the anode-side gap 10a in the upstream side with respect to the extra sealing portion is mixed around the extra sealing portion 11a with the fuel gas flowing in the fuel gas flow channel 7a, and then flows to the downstream side. For this reason, in the face of the electrode (the anode 4a) after the extra sealing portion 11a, the loss due to the inflow of the fuel gas to the anode-side gap 10a is cancelled.

For example, in the case where 10% of the fuel gas is allowed to flow in the anode-side gap 10a between the anode-side gasket 9a and the membrane electrode assembly 5, the extra sealing portion 11a is provided in a position where the pressure loss occurring when 10% of the fuel gas has flown into the anode-side gap 10a before the extra sealing portion 11a will be equal to the pressure loss occurring when the remaining 90% of the fuel gas has flown into the fuel gas flow channel 7a before the extra sealing portion 11a.

The position at which the extra sealing portion 11a is to be disposed is determined according to the necessary amount of fuel gas on the electrode face. During power generation, since the fuel gas is consumed, the gas pressure reduces sharply from the inlet side of the fuel gas flow channel 7a. For this reason, by providing the extra sealing portion 11a in such a manner that among two portions in the face of the anode 4a partitioned by the extra sealing portion 11a, the area of the portion including the inlet side of the fuel gas flow channel 7a is smaller, the influence on the cell performance due to the inflow of the fuel gas to the anode-side gap 10a can be reduced.

In the cathode side also where an oxidant gas flows, for the same reason as described above, the extra sealing portion is preferably placed closer to an inlet side (i.e., the manifold aperture 16 for supplying oxidant gas side) than an outlet side (i.e., the manifold aperture 17 for discharging oxidant gas side) of the oxidant gas flow channel 7b.

Furthermore, it is preferable that at least one of the anode-side gap 10a and the cathode-side gap 10b have a width of more than 0.3 mm and less than 1.5 mm. In the present invention, the anode-side gap 10a and the cathode-side gap 10b, which have been considered undesirable because the reaction gas flows into and moves through therein, are surely provided and positively utilized, so that the foregoing effect can be obtained. And when the width of the gaps falls within the foregoing range, the effect of the present invention can be more reliably obtained.

Figure 5:
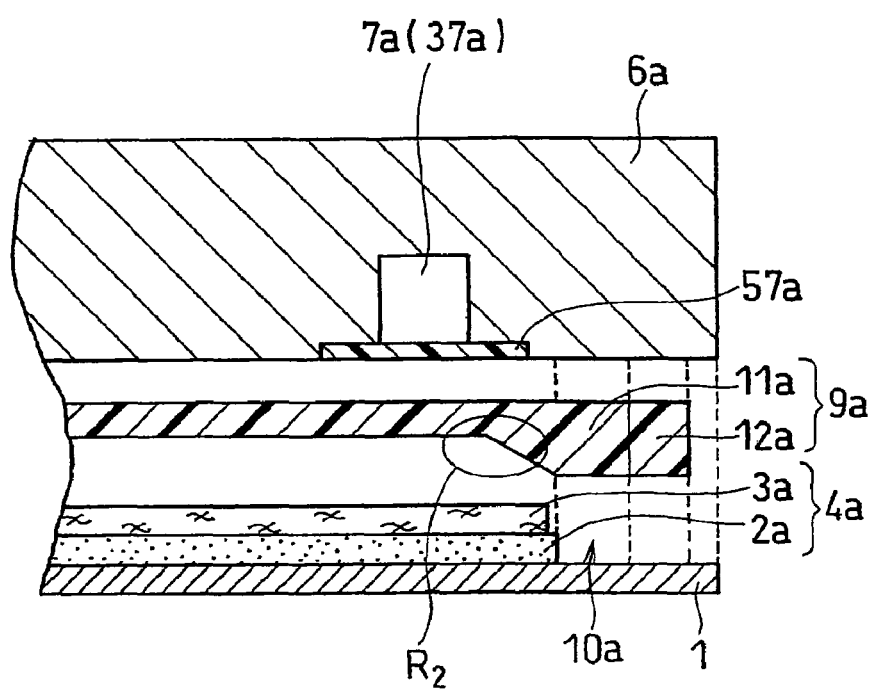
FIG. 5 A schematic exploded sectional view showing a main part (a variant example) in the anode 4a side of the cross section taken along line $X_1$-$X_1$ of FIG. 3.

A variant example of the extra sealing portion 11a of this embodiment is shown in FIG. 5. FIG. 5 is a schematic exploded sectional view showing a main part (a variant example) in the anode side 4a of the cross section taken along line $X_1$-$X_1$ of FIG. 3. As shown in FIG. 5, the anode-side gasket 9a in this variant example has the annular reaction body portion 12a and the extra sealing portion 11a. In the cross section of the extra sealing portion 11a, a portion $R_2$ in contact with the corner of the anode 4a has a slope. As such, it is possible to achieve an effect in which the anode-side gap 10a is reliably blocked, and the anode 4a is less crushed by the extra sealing portion 11a and more reliably fixed.

Second Embodiment

Next, a second embodiment of the fuel cell of the present invention is described. A fuel cell (not shown) of this second embodiment is a variation of the fuel cell 10 of the first embodiment as shown in FIG. 1, in which the configuration of the anode 4a, the cathode 4b and the extra sealing portion 11a is modified. The components other than the anode 4a, the cathode 4b and the extra sealing portion 11a are configured in the same manner as in the fuel cell 10 of the first embodiment. The following is a description of the anode 4a, the cathode 4b and the extra sealing portion 11a included in the fuel cell of the second embodiment.

Figure 6:
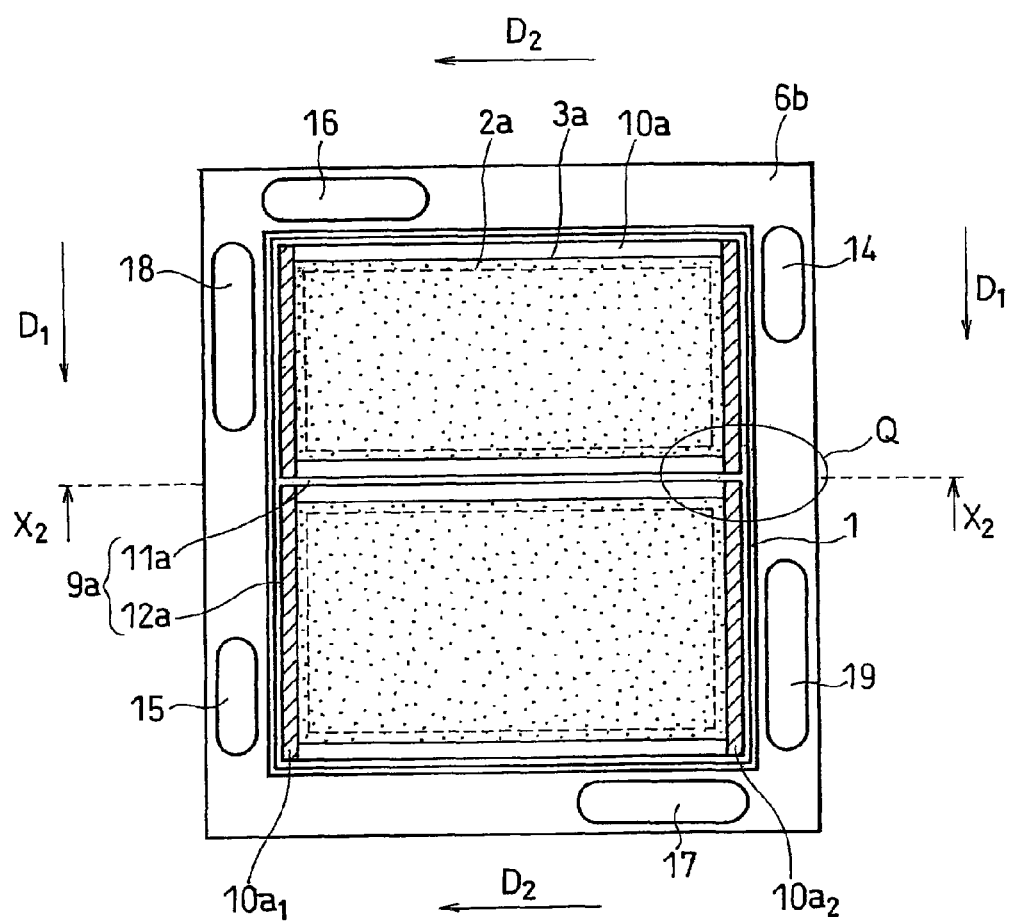
FIG. 6 A view of a second embodiment showing a cross section taken along line II-II of FIG. 1 (a front view of the fuel cell 10 of FIG. 1 after the anode-side separator 6a is removed, viewed from its anode-side separator 6a side (before removal)).

FIG. 6 corresponds to FIG. 3 in the first embodiment, showing a cross sectional view taken along line II-II of FIG. 1 (i.e., a front view of the fuel cell 10 of FIG. 1 after the anode-side separator 6a is removed, viewed from its anode-side separator 6a side (before removal)). Although not shown, a front view of the fuel cell 10 after the cathode-side separator 6b is removed, viewed from its cathode-side separator 6b side (before removal) is similar to this.

As shown in FIG. 6, the anode 4a according to this embodiment is partitioned in such a manner that the areas on both sides of the extra sealing portion 11a are substantially equal to each other. In the region between the divided portions, the extra sealing portion 11a cannot crush the anode 4a.

Figure 7:
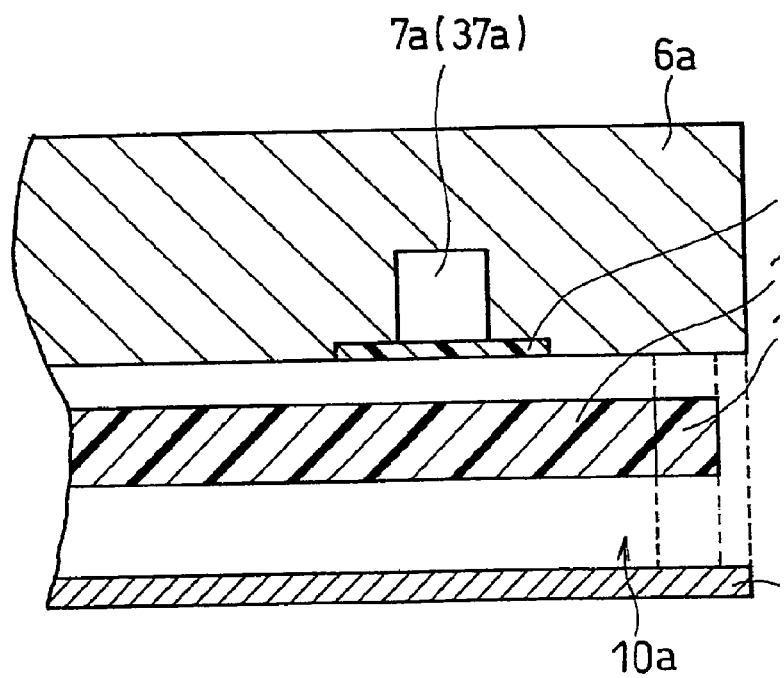
FIG. 7 A schematic exploded sectional view in the second embodiment showing a main part in the anode 4a side of a cross section taken along line $X_2$-$X_2$ of FIG. 6.

FIG. 7 shows a schematic exploded sectional view in this embodiment showing a main part in the anode 4a side of a cross section taken along line $X_2$-$X_2$ of FIG. 6.

As shown in FIG. 7, although the anode-side gasket 9a in this embodiment has the annular main body portion 12a and the extra sealing portion 11a, unlike in the first embodiment, it is not necessary to provide the portion $R_1$ having the right-angled step, and is possible to make the height of the annular main body portion 12a substantially equal to the height of the extra sealing portion 11a. As such, it is possible to achieve an effect in which the anode-side gap 10a is reliably blocked, and the anode 4a cannot be crushed by the extra sealing portion 11a. Although not shown, in the cathode side, an extra sealing portion similar to the anode-side gasket 9a is provided.

According to this embodiment, since the extra sealing portion as described above is provided, even when the reaction gas flows into the anode-side gap 10a and the cathode-side gap 10b formed between the anode-side gasket 9a and the cathode-side gasket 9b, and the membrane electrode assembly 5, the flow therein can be blocked by the extra sealing portion. This makes it possible to effectively inhibit the reaction gas from being directly discharged, without being used for electrode reactions while flowing from a manifold for supplying reaction gas to a manifold for discharging reaction gas.

Consequently, it is possible to provide a fuel cell capable of efficiently using the reaction gas for electrode reactions and favorably improving a power generation performance, in which even when the reaction gas flows into the anode-side gap 10a or the cathode-side gap 10b around the manifold for supplying reaction gas, the reaction gas can be surely introduced into the face of the anode 4a or the cathode 4b by virtue of the extra sealing portion.

Third Embodiment

Next, a third embodiment of the fuel cell of the present invention is described. A fuel cell (not shown) of this third embodiment is a variation of the fuel cell 10 of the first embodiment as shown in FIG. 1, in which the configuration of the extra sealing portion 11a is modified. The components other than the extra sealing portion 11a are configured in the same manner as in the fuel cell 10 of the first embodiment. The following is a description of the extra sealing portion 11a included in the fuel cell of the third embodiment.

Figure 8:
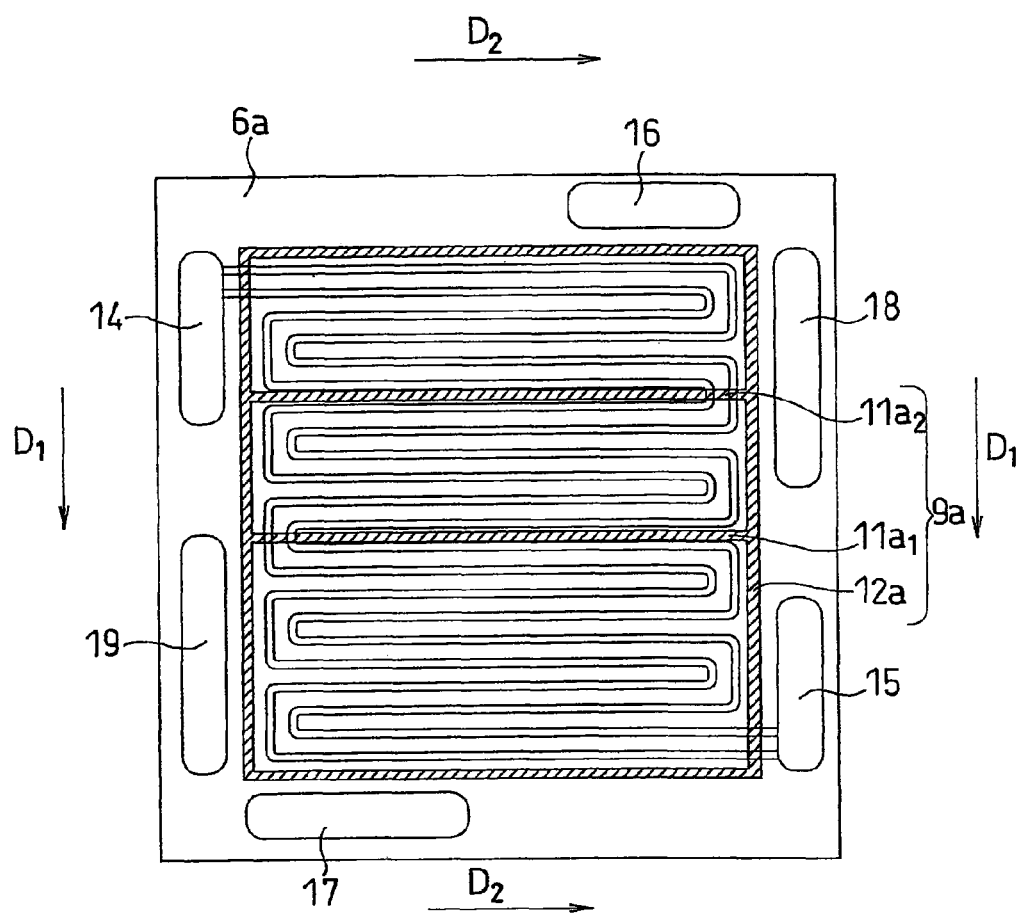
FIG. 8 A view of a third embodiment showing a cross section taken along line I-I of FIG. 1 (i.e., a front view of the anode-side separator 6a in the fuel cell 10 of the third embodiment viewed from its fuel gas flow channel 7a side).

FIG. 8 corresponds to FIG. 2 in the first embodiment, showing a cross sectional view taken along line I-I of FIG. 1 in the third embodiment (i.e., a front view of the anode-side separator 6a in the fuel cell 10 of this embodiment viewed from its fuel gas flow channel 7a side), a region of which being in contact with the anode-side gasket 9a is shown by hatching. Although not shown, a front view of the cathode-side separator 6b in the fuel cell 10 viewed from its oxidant gas flow channel side 7b is similar to this.

The extra sealing portion in this embodiment is composed of a first extra sealing portion $11a_1$ and a second extra sealing portion $11a_2$. Specifically, as described in the foregoing first embodiment, the substantially rectangular anode-side gap 10a also includes a pair of gap portions having a smaller pressure gradient and being in substantially parallel with the direction indicated by the arrow $D_2$; and a pair of gap portions having a larger pressure gradient and being in substantially parallel with the direction indicated by the arrow $D_1$ (the portions defined by hatching in FIG. 3). Accordingly, the first extra sealing portion $11a_1$ and the second extra sealing portion $11a_2$ connected with the annular main body portion 12a are provided so as to intersect with the pair of gap portions (the portions defined by hatching in FIG. 3) having a larger pressure gradient and being in substantially parallel with the direction indicated by the arrow $D_1$, namely, the direction in which the fuel gas moves more readily by virtue of the pressure gradient as described above. Although not shown, in the cathode side, two extra sealing portions are provided.

According to this embodiment, since the two extra sealing portions as described above are provided, even when the reaction gas flows into the anode-side gap 10a and the cathode-side gap 10b formed between the anode-side gasket 9a and the cathode-side gasket 9b, and the membrane electrode assembly 5, the flow therein can be more reliably blocked by the extra sealing portions. This makes it possible to effectively inhibit the reaction gas from being directly discharged, without being used for electrode reactions while flowing from a manifold for supplying reaction gas to a manifold for discharging reaction gas.

Consequently, it is possible to provide a fuel cell capable of efficiently using the reaction gas for electrode reactions and favorably improving a power generation performance, in which even when the reaction gas flows into the anode-side gap 10a or the cathode-side gap 10b around the manifold for supplying reaction gas, the reaction gas can be more reliably introduced into the face of the anode 4a or the cathode 4b by virtue of the two extra sealing portions.

Although the embodiments of the present invention are described above in detail, the present invention is not limited to the foregoing embodiments. Further, in the respective embodiments, the configuration of another embodiment can be employed in part.

Figure 9:
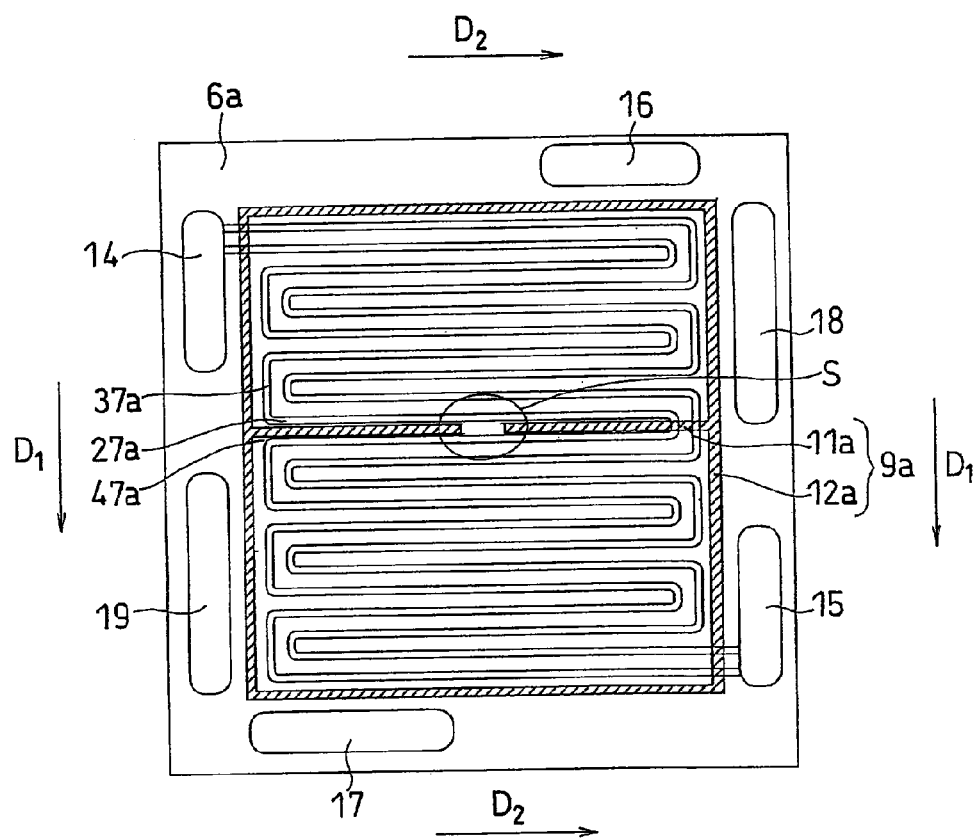
FIG. 9 A front view of the anode-side separator 6a in a variant example of the fuel cell 10 of the first embodiment, viewed from its fuel gas flow channel 7a side.
Figure 10:
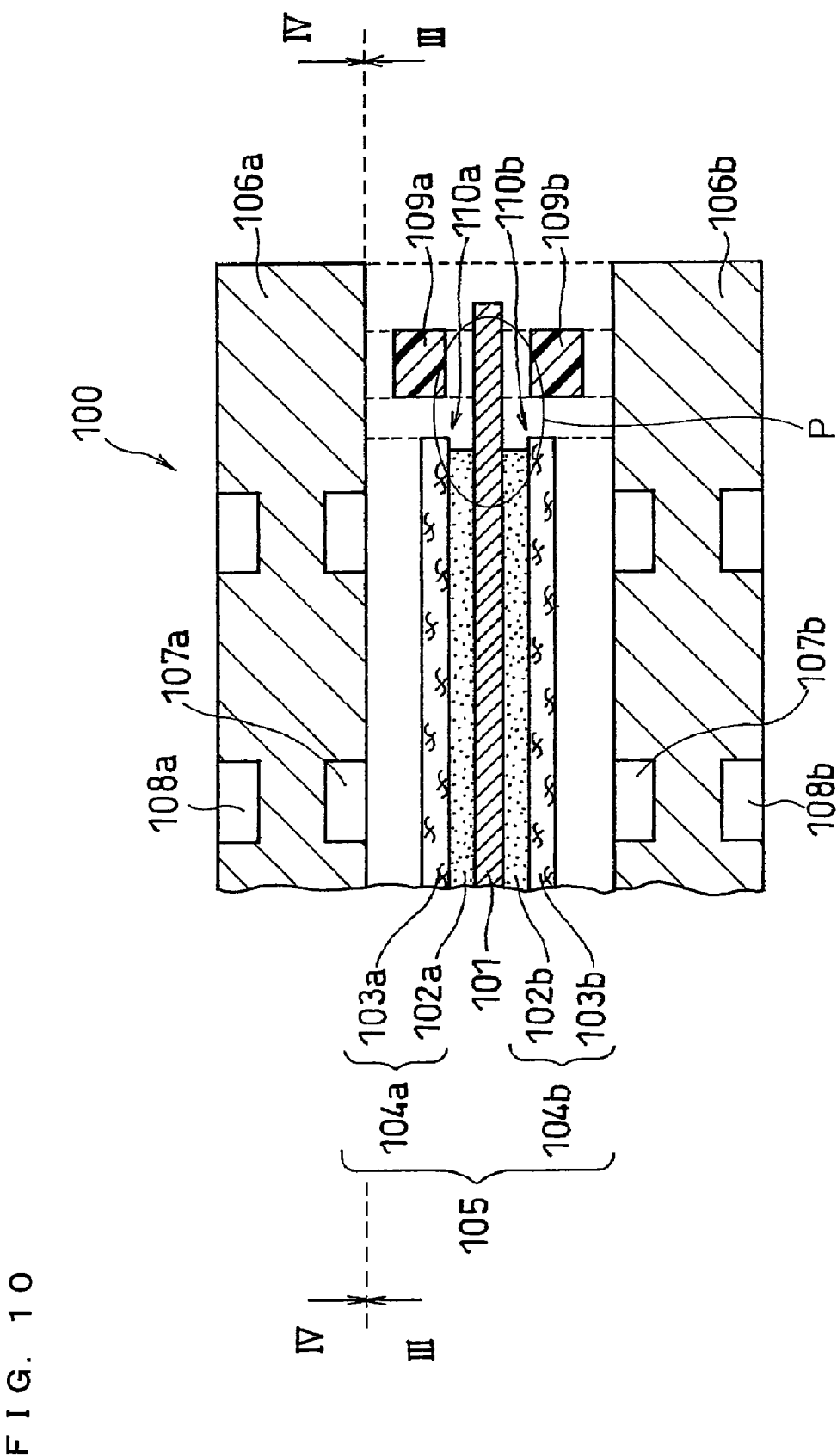
FIG. 10 A schematic exploded sectional view showing a main part of a general basic configuration of a conventional polymer electrolyte fuel cell.
Figure 11:
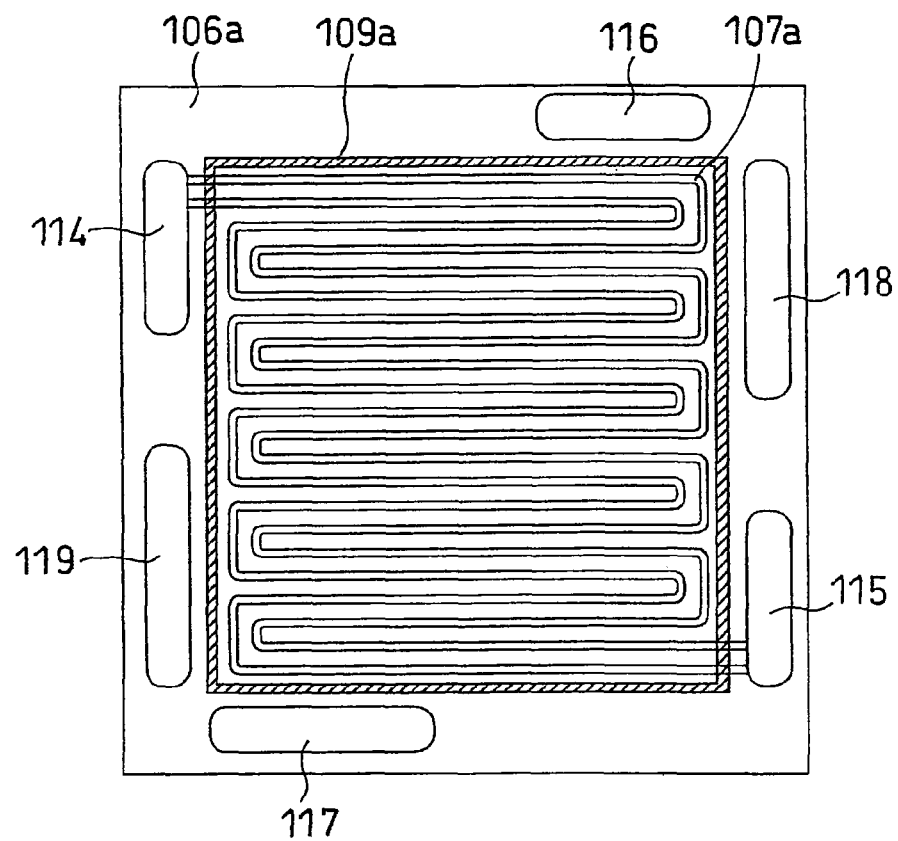
FIG. 11 A view showing a cross section taken along line III-III of FIG. 10 (i.e., a front view of the anode-side separator 106a in the conventional fuel cell 100 viewed from its fuel gas flow channel 107a side).

For example, in the foregoing embodiments, description is made about the embodiments in which, among two pairs of sides opposing to each other in the annular main body portion 12a, the extra sealing portion 11a for connecting one pair of the sides adjacent to the forgoing pair of gap portions having a larger pressure gradient is provided. However, for example, in the first embodiment, it will suffice if the extra sealing portion 11a intersects with the pair of gap portions having a larger pressure gradient as described above, and the extra sealing portion may be partly cut away (see FIG. 9). In FIG. 9, a cut-away portion S is provided in the middle of the extra sealing portion 11a. Likewise, in the second embodiment and the third embodiment also, the extra sealing portion may be provided with a cut-away portion.

Further, in the third embodiment, the extra sealing portion 11a having the cross section as shown in either FIG. 4 or FIG. 5, which is described in the first embodiment, may be employed; and alternatively, the extra sealing portion 11a having the cross section as shown in FIG. 7, which is described in the second embodiment, may be employed, and in addition, the anode 4a and the cathode 4b may be each partitioned into three portions and disposed.

Furthermore, for example, in light of the stoichiometry reaction between hydrogen and oxygen, twice as much hydrogen by volume as oxygen is necessary. Therefore, in the case where air is used as the oxidant gas, since the oxygen concentration in air is approximately 20 volume %, the flow rate of air to the cathode is greater than the flow rate of fuel gas to the anode. Moreover, in light of improvement in the fuel utilization rate, the flow rate of fuel gas needs to be reduced.

For this reason, in the fuel gas flow channel, the meandering portion is increased in number and length as compared with the one in the oxygen gas flow channel, and the difference between the length of the fuel gas flow channel and the length of the anode-side gap is greater than the difference between the length of the oxidant gas flow channel and the length of the cathode-side gap, creating an environment in which the reaction gas more readily flow into the anode-side gap than the cathode-side gap. Therefore, it is more effective to provide the extra sealing portion preferentially in the anode side.

Further, as in the above embodiments, in the case where the fuel gas flow channel and the oxidant gas flow channel are composed of a plurality of grooves, the plurality of grooves may have different flow channel lengths (track lengths) depending on the number of bended directions. In this case, it is preferable that among the plurality of grooves, a groove in which the distance from a manifold aperture for supplying reaction gas to a manifold aperture for discharging reaction gas is longer have a larger cross-sectional area than a groove in which the distance from the manifold aperture for supplying reaction gas to the manifold aperture for discharging reaction gas is shorter. By employing this configuration, the difference in pressure loss among the grooves having different flow channel lengths can be eliminated, and thus the flow of reaction gas can be stabilized.

Moreover, in the region where the fuel gas flow channel and the oxidant gas flow channel in the upstream side are adjacent to the fuel gas flow channel and the oxidant gas flow channel in the downstream side, it is preferable that the width between the channels (i.e., the width of the rib) be made wide. By doing this, it is possible to prevent the reaction gas from directly flowing into the channels in the downstream from the channels in the upstream.

In light of preventing cross-leakage of the fuel gas and the oxidant gas, as well as effectively preventing the both gases from flowing into the gas flow channels, it is also preferable that in the anode-side separator 6a, the manifold aperture 14 for supplying fuel gas is distanced from the manifold aperture 15 for discharging fuel gas; and in the cathode-side separator 6b, the manifold aperture 18 for supplying oxidant gas is distanced from the manifold aperture 19 for discharging oxidant gas. If the manifolds are positioned in proximity to each other, it is preferable that the width of the rib between the flow channels communicating to the manifold apertures be set larger in the vicinity of the manifold apertures.

In the present invention, the configuration of the fuel gas flow channel in the anode-side separator and the configuration of the oxidant gas flow channel in the cathode-side separator may be modified as appropriate, and the both configurations may be the same or different. Moreover, the number of the straight line portions and the number of the curved portions are not particularly limited, and may be set to any appropriate number as long as the effects of the present invention are not impaired.

In addition, no particular limitation is imposed on the shape of the cooling fluid flow channel in the anode-side separator and the shape of the cooling fluid flow channel in the cathode-side separator, and a configuration similar to the conventional one that connects the manifold aperture for supplying cooling fluid with the manifold aperture for discharging cooling fluid may be employed. For example, it will suffice if the cooling fluid flow channel is disposed in one of the anode-side separator and the cathode-side separator. It is not necessary to provide the cooling fluid flow channel in the both separators.

Further, in the case of stacking a plurality of unit cells, one cooling fluid flow channel may be provided every two unit cells. In this case, for example, the configuration may be such that in the anode-side separator, the fuel gas flow channel is provided on one face and the cooling fluid flow channel is provided on the other face; and in the cathode-side separator, the oxidant gas flow channel is provided on one face thereof and the other face is left flat.

EXAMPLES

Although the present invention is described below in detail with reference to Examples, the present invention is not limited to these.

Example 1

For the MEA, "PRI MEA (trade name)" available from Japan Gore-Tex Inc. having the configuration as shown in FIG. 1 was prepared. Gaskets were bonded on the circumference portion of the polymer electrolyte membrane by means of hot pressing, so that the configuration as shown in FIG. 1 was obtained.

In this Example, a 3 mm width sealing member of Viton (trade name) was mounted between the gas diffusion layer and the gasket in the cathode side, which served as the extra sealing member 11a as shown in FIG. 2 to FIG. 4. Specifically, the sealing member was placed so as to traverse a pair of sides having a larger oxygen gas pressure loss, at the intermediate position between the upstream and downstream portions.

The anode-side separator and the cathode-side separator were stacked with the MEA interposed therebetween, and a current collector and an insulating plate were placed on each of the both ends of stacked separators and MEAs to form a stacked body. The stacked body was placed between a pair of end plates, and then fixed between the pair of end plates with springs and clamping members, whereby a fuel cell of this Example was obtained.

The gas flow channels were formed by cutting on conductive flat plates having a size corresponding to that of the foregoing MEA, to obtain the anode-side separator and the cathode-side separator provided with a gas flow channel on one of the main faces of each separator.

In this Example 1, the gas flow channel of fuel gas in the anode-side separator was formed in the same geometrical conditions as the gas flow channel shown in FIG. 2 except that a gas flow channel composed of three grooves were formed in place of the gas flow channel composed of two grooves.

Further, in this Example 1, the gas flow channel of oxidant gas in the cathode-side separator was formed in the same geometrical conditions as the gas flow channel shown in FIG. 2, except that a gas flow channel composed of seven grooves were formed in place of the gas flow channel composed of two grooves.

Comparative Example 1

A fuel cell was fabricated having the same configuration as in Example 1 except that, compared with the fuel cell of Example 1, no extra sealing potion was provided.

Evaluation Test

The fuel cells of Example 1 and the fuel cells of Comparative Example 1 were used to measure a threshold oxygen gas utilization rate under the following operation conditions. The results are shown in Table 1.

In this evaluation test, threshold oxygen gas utilization rates of the fuel cells of Example 1 and the fuel cells of Comparative Example 1 were determined separately, and an arithmetic mean thereof was calculated for Example 1 and Comparative Example 1, which was referred to as a threshold oxygen gas utilization rate. The "threshold oxygen gas utilization rate" means a maximum oxygen gas utilization rate with which a fuel cell can stably generate power without causing voltage drop.

Fuel cell temperature: 62° C.
Fuel gas ($H_2$) utilization rate: 75%
Oxygen gas ($O_2$) utilization rate: 50 to 98%
Humidification temperature of fuel gas/oxygen gas: 66° C.

TABLE 1

|  | Threshold oxygen gas utilization rate (%) |
| --- | --- |
| Example | 98% |
| Comparative Example | 87% |

In Example 1, when the oxygen gas utilization rate was 98%, a voltage drop did not occur. In contrast, in Comparative Example 1, when the oxygen gas utilization rate exceeded 87%, a voltage drop began.

As is evident from the results shown in Table 1, the fuel cell of the present invention has a high threshold oxygen gas utilization rate, and exerts a sufficient power generation performance.

INDUSTRIAL APPLICABILITY

The polymer electrolyte fuel cell of the present invention is capable of suppressing a reduction in the utilization rate of reaction gas and is suitably applicable to fuel cells including a solid polymer electrolyte membrane, and particularly to stationary cogeneration systems, electric automobiles, and the like.

The invention claimed is:

1. A fuel cell including a unit cell comprising:
a membrane electrode assembly including a polymer electrolyte membrane with hydrogen ion conductivity, and an anode and a cathode sandwiching said polymer electrolyte membrane;
an anode-side separator with electric conductivity including a fuel gas flow channel for supplying and discharging a fuel gas to and from said anode;
a cathode-side separator with electric conductivity including an oxidant gas flow channel for supplying and discharging an oxidant gas to and from said cathode; and
an anode-side gasket disposed on a circumference portion of said membrane electrode assembly in a face of said anode-side separator and a cathode-side gasket disposed on a circumference portion of said membrane electrode assembly in a face of said cathode-side separator, for sealing said fuel gas and said oxidant gas, respectively, wherein
an anode-side gap of a substantially rectangular shape is formed between said anode-side gasket and said membrane electrode assembly in the side of said anode and a cathode-side gap of a substantially rectangular shape is formed between said cathode-side gasket and said membrane electrode assembly in the side of said cathode, and
at least one of said anode-side gasket and said cathode-side gasket has: an annular main body portion disposed along the circumference portion of said membrane electrode assembly; and an extra sealing portion being integrated with said main body portion and bridging two points on opposite sides of said main body portion such that, among two pairs of gap portions opposing to each other in said anode-side gap and said cathode-side gap, said extra sealing portion partially intersects with one pair of said gap portions having a larger pressure gradient of said fuel gas and said oxidant gas in a direction from an upstream side to a downstream side of said fuel gas flow channel and said oxidant gas flow channel.

2. The fuel cell in accordance with claim 1, wherein at least one of said fuel gas flow channel and said oxidant gas flow channel has a serpentine shape including a plurality of straight line portions and a curved portion connecting said straight line portions adjacent to each other.

3. The fuel cell in accordance with claim 2, wherein said extra sealing portion is placed on a rib between said plurality of straight line portions.

4. The fuel cell in accordance with claim 1, wherein at least one of said anode-side gap and said cathode-side gap has a width of more than 0.3 mm and less than 1.5 mm.

5. The fuel cell in accordance with claim 1, wherein said extra sealing portion is placed closer to an inlet side than an outlet side of said fuel gas flow channel and said oxidant gas flow channel.

* * * * *